United States Patent
Chen

(10) Patent No.: US 9,746,942 B2
(45) Date of Patent: Aug. 29, 2017

(54) OPTICAL TOUCH PEN

(71) Applicant: DELTA ELECTRONICS, INC., Taoyuan Hsien (TW)

(72) Inventor: Hsin-Chi Chen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 317 days.

(21) Appl. No.: 14/462,227

(22) Filed: Aug. 18, 2014

(65) Prior Publication Data

US 2015/0193021 A1 Jul. 9, 2015

Related U.S. Application Data

(60) Provisional application No. 61/924,024, filed on Jan. 6, 2014.

(30) Foreign Application Priority Data

Jul. 3, 2014 (TW) .............................. 103122949 A

(51) Int. Cl.
*G06F 3/033* (2013.01)
*G06F 3/0354* (2013.01)
*G06F 3/038* (2013.01)

(52) U.S. Cl.
CPC ........ *G06F 3/03542* (2013.01); *G06F 3/0386* (2013.01); *G06F 3/03545* (2013.01)

(58) Field of Classification Search
CPC ........... G06F 3/035422; G06F 3/03545; G06F 3/0386

See application file for complete search history.

(56) References Cited

U.S. PATENT DOCUMENTS 5,850,059 A * 12/1998 Yoshimura .......... G06F 3/03545
178/19.01
6,066,811 A * 5/2000 Heilman, III ....... G06F 3/03545
178/18.01

(Continued)

FOREIGN PATENT DOCUMENTS

| CN | 101719027 A | 6/2010 |
|---|---|---|
| CN | 103309470 | 9/2013 |
| TW | 201327280 A | 7/2013 |

*Primary Examiner* — Amare Mengistu
*Assistant Examiner* — Crystal A Mathews
(74) *Attorney, Agent, or Firm* — Kirton McConkie; Evan R. Witt

(57) ABSTRACT

An optical touch pen includes a pen case, an operation module, and a power module. The operation module is disposed within an upper cover of the pen case, and includes a pen tip, a supporting part, a circuit board and a multi-directional auxiliary element. The multi-directional auxiliary element is arranged between an inner wall of the upper cover and the engaging structure of the supporting part. The power module is disposed within a lower cover of the pen case. When an external force is applied to the pen tip, the pen tip and the supporting part are shifted in response to the external force, the engaging structure of the supporting part is shifted relative to the multi-directional auxiliary element, and the external force is transmitted downwardly to the circuit board. Consequently, a current switch on the circuit board is triggered and the power module is electrically conducted.

9 Claims, 9 Drawing Sheets

(56) References Cited

U.S. PATENT DOCUMENTS

| | | | | |
|---|---|---|---|---|
| 6,204,457 B1* | 3/2001 | Shekhel | ............. | G06F 3/03545 |
| | | | | 178/19.01 |
| 6,292,180 B1* | 9/2001 | Lee | ................... | G06F 3/03545 |
| | | | | 178/18.04 |
| 7,180,509 B2* | 2/2007 | Fermgard | ........... | G06F 3/03542 |
| | | | | 178/19.05 |
| 7,567,241 B2* | 7/2009 | King | ..................... | G02B 26/06 |
| | | | | 178/18.01 |
| 8,648,839 B2* | 2/2014 | Liaw | .................. | G06F 3/03545 |
| | | | | 178/18.01 |
| 8,878,823 B1* | 11/2014 | Kremin | .............. | G06F 3/03545 |
| | | | | 178/18.06 |
| 2002/0158854 A1* | 10/2002 | Ju | ...................... | G06F 3/03545 |
| | | | | 345/179 |
| 2009/0114459 A1* | 5/2009 | Fukushima | ......... | G06F 3/03545 |
| | | | | 178/19.03 |
| 2009/0122029 A1* | 5/2009 | Sin | ..................... | G06F 3/03545 |
| | | | | 345/179 |
| 2010/0164434 A1* | 7/2010 | Cacioppo | ........... | G06F 3/03545 |
| | | | | 320/115 |
| 2011/0155480 A1* | 6/2011 | Liang | ................. | G06F 3/03545 |
| | | | | 178/19.01 |
| 2011/0198134 A1* | 8/2011 | Chen | ................... | G06F 3/03542 |
| | | | | 178/19.05 |
| 2011/0304577 A1 | 12/2011 | Brown et al. | | |
| 2015/0116289 A1* | 4/2015 | Stern | ................. | G06F 3/03545 |
| | | | | 345/179 |

* cited by examiner

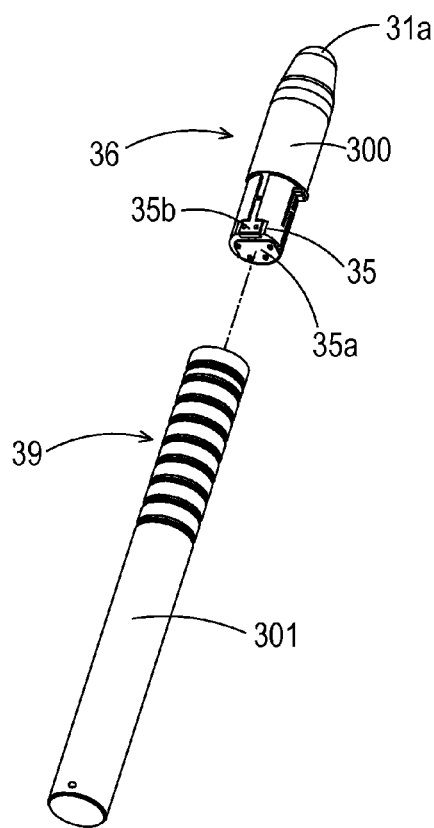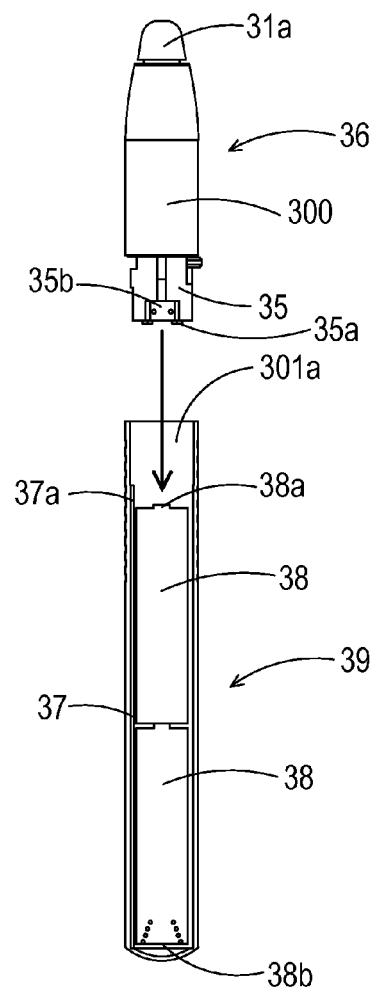
FIG. 5A
FIG. 5B

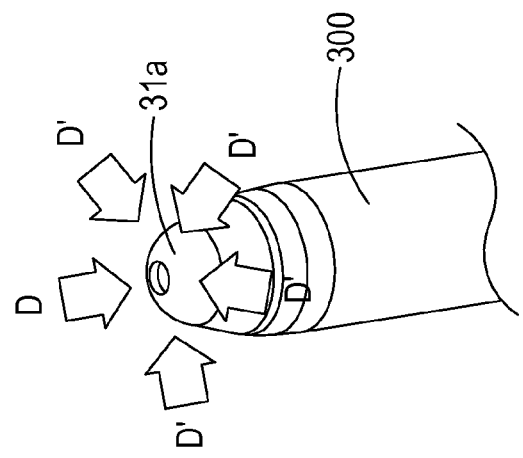
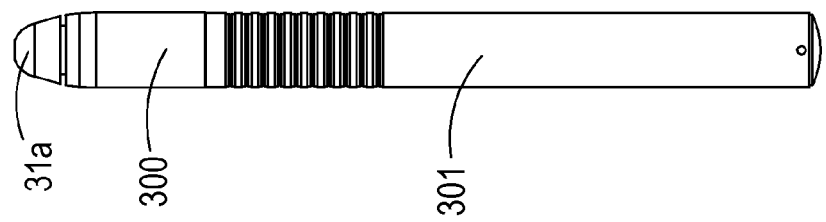
FIG. 5D
FIG. 5C

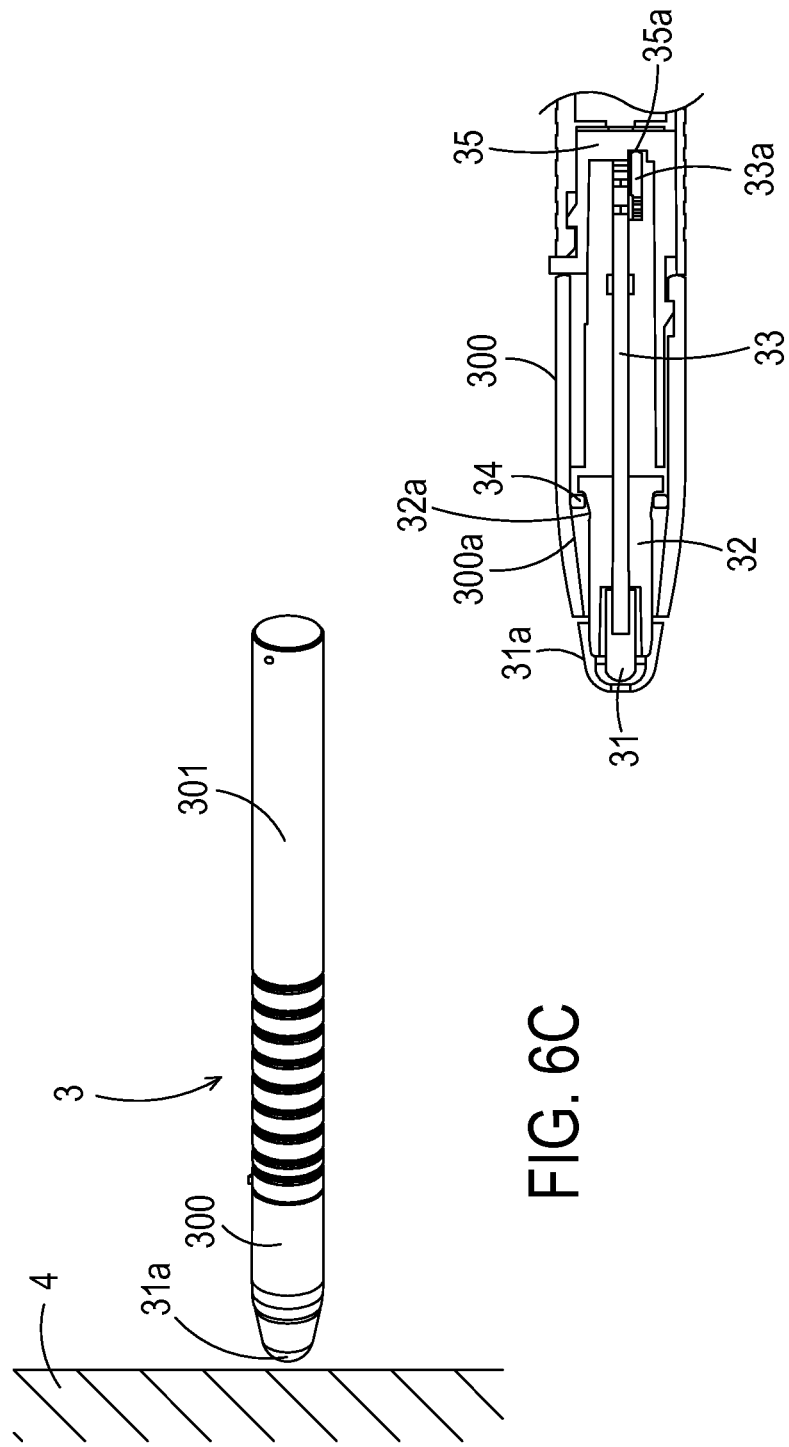

OPTICAL TOUCH PEN

CROSS-REFERENCE TO RELATED APPLICATION

This application claims the benefit of U.S. Provisional Application No. 61/924,024 filed on Jan. 6, 2014, and entitled "OPTICAL PEN FOR CONTROLLING PROJECTOR", the entirety of which is hereby incorporated by reference.

FIELD OF THE INVENTION

The present invention relates to an optical pen, and more particularly to an optical touch pen capable of performing multi-directional operations.

BACKGROUND OF THE INVENTION

With the rapid development of optical projection industries, optical projection systems are widely used as auxiliary tools in conferences or meetings by companies or individuals. Generally, an optical pen can be directly interacted with the optical projection system in real time by tapping a touch screen or performing an editing operation. Consequently, the optical pen is very convenient to the user.

FIG. 1A is a schematic cross-sectional view illustrating a portion of a conventional optical pen. FIG. 1B is a schematic cross-sectional view illustrating a portion of another conventional optical pen. As shown in FIG. 1A, the conventional optical pen 1 comprises a pen case 10 and an operation module 12. The operation module 12 is disposed within the pen case 10. Moreover, a current switch 11 is further disposed within the pen case 10. The operation module 12 comprises a pen tip 13, a covering part 14 and a supporting part 15. The pen tip 13 includes an infrared light emitting diode (IR LED). The supporting part 15 is coupled with the pen tip 13. The supporting part 15 has some electrical traces (not shown). The covering part 14 is a tube arranged around the pen tip 13 and the supporting part 15. There is a gap between the covering part 14 and the pen case 10. Consequently, the operation module 12 is movable within the pen case 10. During the process of touching a working surface (e.g. a wall surface) by using the optical pen 1, the pen tip 13 is vertical to the working surface. Consequently, a normal counterforce A is generated by the working surface. In response to the normal counterforce A, the pen tip 13 and the supporting part 15 are pushed back. Consequently, the current switch 11 within the pen case 10 is pressed by the supporting part 15 and electrically conducted. Under this circumstance, the IR LED at the pen tip 13 will be turned on, and the subsequent operation procedures will be performed.

As shown in FIG. 1B, the conventional optical pen 2 comprises a pen case 20, an operation module 22, and a current switch 21. The current switch 21 is disposed within the pen case 20. The operation module 22 is also disposed within the pen case 20, and comprises a pen tip 23 and a supporting part 24. The supporting part 24 is coupled with the pen tip 23. In comparison with the optical pen 1 of FIG. 1A, the structure of the supporting part 24 is simpler. The supporting part 24 is an inverted T-shaped structure with a flat base 24a. The periphery of the flat base 24a is in contact with the inner wall of the pen case 20. During the process of touching the working surface by using the optical pen 2, the pen tip 23 is vertical to the working surface. Consequently, a normal counterforce A' is generated by the working surface. In response to the normal counterforce A', the pen tip 23 and the supporting part 24 are pushed back. Consequently, the current switch 21 is pressed by the flat base 24a of the supporting part 24 and electrically conducted. Under this circumstance, the IR LED at the pen tip 23 will be turned on, and the subsequent operation procedures will be performed.

Ideally, during the process of touching the working surface by using the optical pen 1 or 2, the pen tip 13 or 23 is vertical to the working surface. In some situations, the pen tip 13 or 23 is not vertical to the working surface. Generally, the gesture of grasping the optical pen is like the gesture of grasping the handwriting pen. That is, the optical pen is usually inclined relative to the working surface.

FIG. 2A is a schematic cross-sectional view illustrating a portion of the conventional optical pen of FIG. 1A, in which the optical pen is inclined relative to the working surface. During the process of touching the working surface, the pen tip 13 is inclined relative to the working surface. Consequently, an inclined counterforce B is generated by the working surface. In response to the inclined counterforce B, the operation module 12 is inclined. Meanwhile, since an external surface of the covering part 14 is in contact with the inner wall of the pen case 10, the movement of the operation module 12 is limited. Moreover, since the pen tip 13 and the supporting part 15 are inclined and pushed back in response to the inclined counterforce B, the current switch 11 is pressed by the supporting part 15 and electrically conducted. Although the optical pen 1 is electrically conducted in response to the inclined counterforce B, some problems may occur. For example, the vertical component of the inclined counterforce B is less than the vertical counterforce A as shown in FIG. 1A. Consequently, it is difficult to trigger the current switch 11. More especially, while the optical pen 1 is horizontal to the working surface to touch the working surface, a horizontal counterforce C is generated by the working surface. Since vertical component of the horizontal counterforce C is very small, the touch sensitivity of the pen tip 13 is impaired.

FIG. 2B is a schematic cross-sectional view illustrating a portion of the conventional optical pen of FIG. 1B, in which the optical pen is inclined relative to the working surface. While the optical pen 2 is horizontal to the working surface to touch the working surface, a horizontal counterforce C' is generated by the working surface. In response to the horizontal counterforce C', the pen tip 23 is moved horizontally. Since the supporting part 24 is coupled with the pen tip 23, the supporting part 24 is correspondingly inclined. Meanwhile, the flat base 24a of the supporting part 24 is correspondingly inclined and in contact with the inner wall of the pen case 20 according to the lever principle. Consequently, the current switch 21 is pressed by the flat base 24a of the supporting part 24 and electrically conducted.

From the above discussions about the conventional optical pen 1 or 2, the movement of the operation module 12 or 22 to trigger the current switch 11 or 21 is restricted by the pen case 10 or 20. When the pen tip 13 or 23 of the optical pen 1 or 2 is inclined relative to or horizontal to the working surface to touch the working surface, the touch sensitivity of the pen tip 13 or 23 is impaired. Moreover, a great number of components are disposed within the pen case 10 or 20, the arrangements of the components within the pen case 10 or 20 are dispersed, and the components of the operation module 12 or 22 need to be assembled together one by one. Consequently, the procedures of assembling the operation module 12 or 22 and the optical pen 1 or 2 are very complicated. Moreover, since a portion of the circuitry is disposed within the operation module 12 or 22 and another portion of the circuitry is extended downwardly, the components of the circuitry are dispersed. In other words, the assembling process is complicated, labor-intensive and time-consuming.

Therefore, there is a need of providing an improved optical touch pen in order to eliminate the above drawbacks.

SUMMARY OF THE INVENTION

The present invention provides an optical touch pen in order to eliminate the drawbacks that the procedure of assembling a conventional optical pen is complicated, labor-intensive and time-consuming, and the touch control sensitivity of the optical pen is impaired when the multi-directional operations of the conventional optical pen are performed. The inventive optical touch pen may be assembled by using less number of components and a simplified assembling process. Since the subsequent assembling process is simplified and rapid, the fabricating cost is effectively reduced. Moreover, the multi-directional touch control is achieved without impairing the control sensitivity.

In accordance with an aspect of the present invention, there is provided an optical touch pen. The optical touch pen includes a pen case, an operation module, and a power module. The pen case includes an upper cover and a lower cover. The operation module is disposed within the upper cover, and includes a pen tip, a supporting part, a circuit board and a multi-directional auxiliary element. The supporting part has an engaging structure. A current switch is disposed on an end of the circuit board. The multi-directional auxiliary element is arranged between an inner wall of the upper cover and the engaging structure of the supporting part. The pen tip and the circuit board are clamped by two ends of the supporting part, respectively. The power module is disposed within the lower cover and electrically connected with the current switch of the operation module. When an external force is applied to the pen tip of the operation module, the pen tip and the supporting part are shifted in response to the external force, the engaging structure of the supporting part is correspondingly shifted relative to the multi-directional auxiliary element, and the external force is transmitted downwardly to the circuit board, so that the current switch on the circuit board is triggered and the power module is electrically conducted.

The above contents of the present invention will become more readily apparent to those ordinarily skilled in the art after reviewing the following detailed description and accompanying drawings, in which:

BRIEF DESCRIPTION OF THE DRAWINGS

FIG. 5A is a schematic exploded view illustrating the relationship between the operation module and the power module of the optical touch pen according to the embodiment of the present invention;

FIG. 5B is a schematic cross-sectional view illustrating the relationship between the operation module and the power module of the optical touch pen of FIG. 5A;

FIG. 5C is a schematic perspective view illustrating the assembled structure of the optical touch pen of FIG. 5A;

FIG. 5D is a schematic perspective view illustrating the pen tip of the optical touch pen of FIG. 5C;

FIG. 6C schematically illustrates a vertical touch control action of the optical touch pen according to the embodiment of the present invention, in which the optical touch pen is vertical to the working surface; and FIG. 6D is a schematic cross-sectional view illustrating a portion of the optical touch pen of FIG. 6C.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
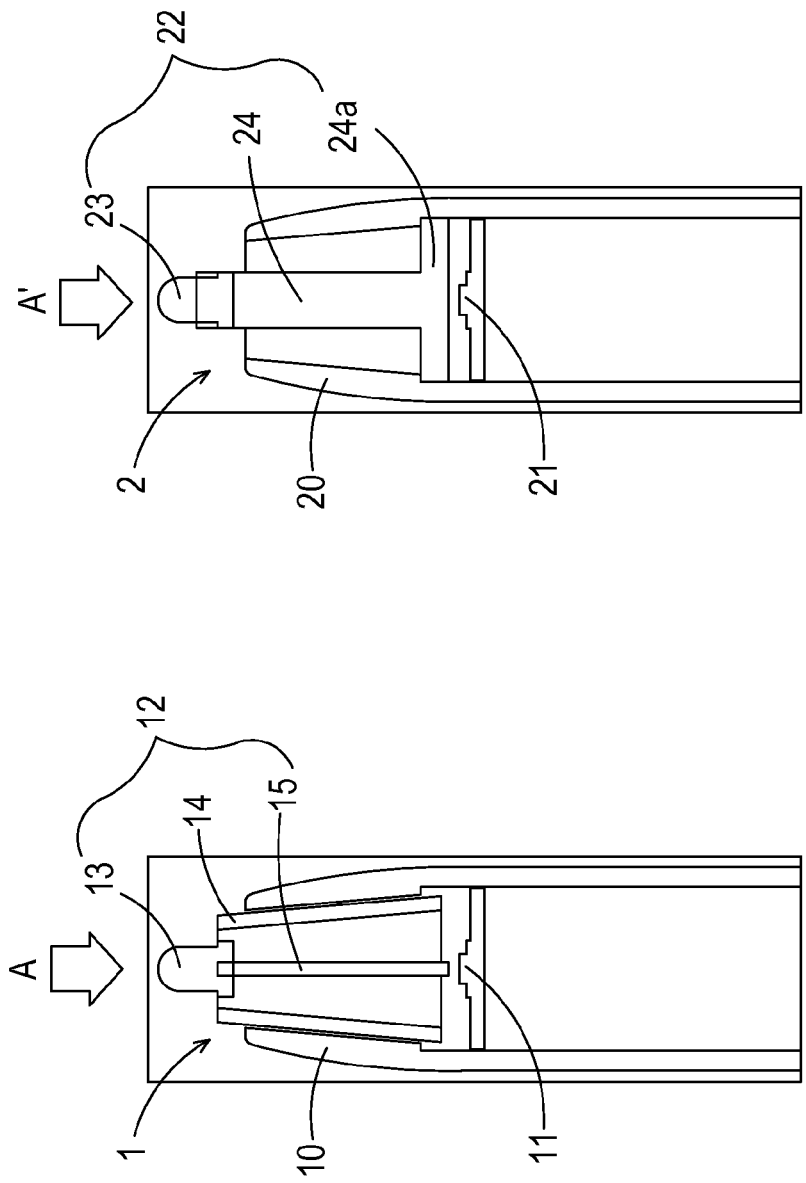
FIG. 1A is a schematic cross-sectional view illustrating a portion of a conventional optical pen.
FIG. 1B is a schematic cross-sectional view illustrating a portion of another conventional optical pen.
Figure 2:
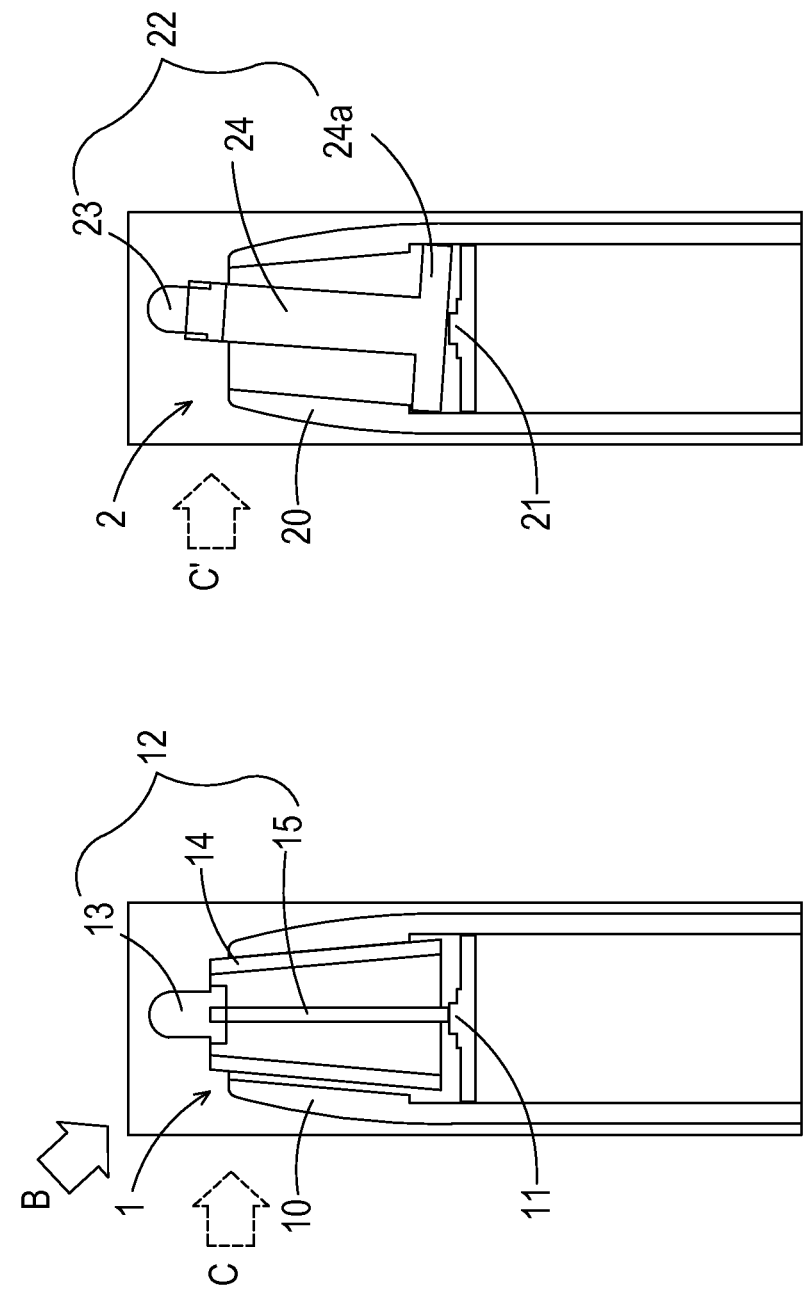
FIG. 2A is a schematic cross-sectional view illustrating a portion of the conventional optical pen of FIG. 1A, in which the optical pen is inclined relative to the working surface.
FIG. 2B is a schematic cross-sectional view illustrating a portion of the conventional optical pen of FIG. 1B, in which the optical pen is inclined relative to the working surface.
Figure 3:
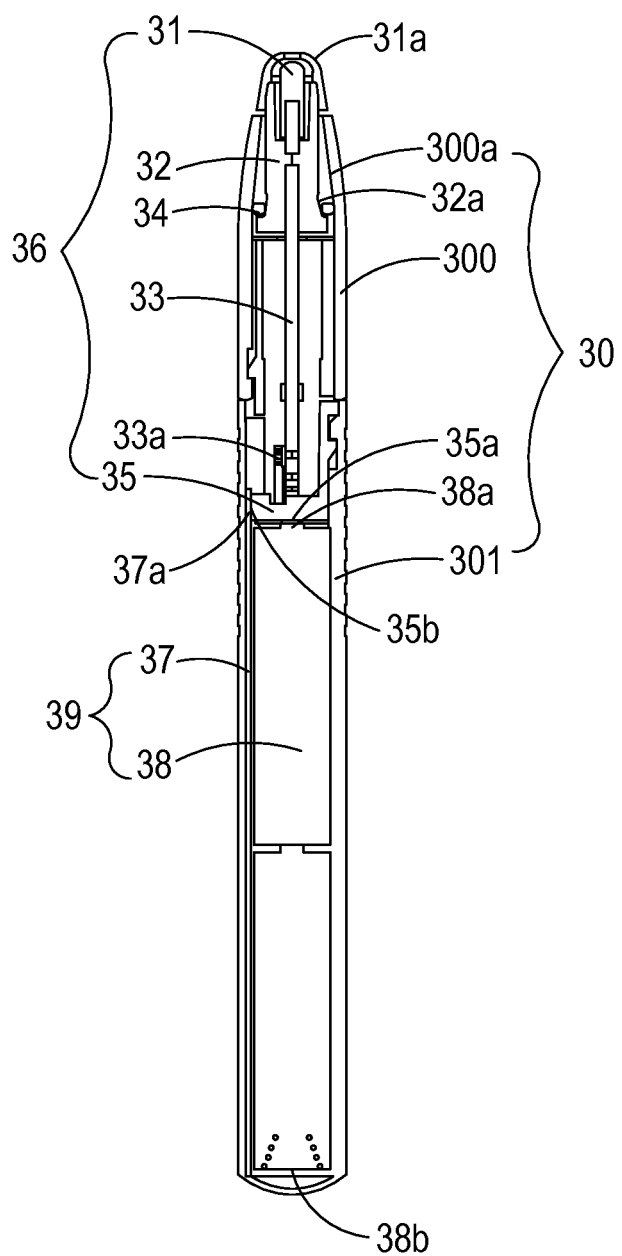
FIG. 3 is a schematic cross-sectional view illustrating an optical touch pen according to an embodiment of the present invention.

FIG. 3 is a schematic cross-sectional view illustrating an optical touch pen according to an embodiment of the present invention. As shown in FIG. 3, the optical touch pen 3 comprises a pen case 30, an operation module 36, and a power module 39. The pen case 30 is a pen-like case. The pen case 30 comprises an upper cover 300 and a lower cover 301. The upper cover 300 and the lower cover 301 are hollow structures. The operation module 36 and the power module 39 are disposed within the upper cover 300 and the lower cover 301, respectively. In this embodiment, the operation module 36 comprises a pen tip 31, a supporting part 32, a circuit board 33, a multi-directional auxiliary element 34, and a sleeve 35. An example of the pen tip 31 of the operation module 36 includes but is not limited to an infrared light emitting diode (IR LED). The pen tip 31 and the circuit board 33 are clamped by two ends of the supporting part 32, respectively. Moreover, an engaging structure 32a is concaved in a surface of a lower region of the supporting part 32. A current switch 33a is disposed on an end of the circuit board 33. The multi-directional auxiliary element 34 is arranged between an inner wall 300a of the upper cover 300 and the engaging structure 32a of the supporting part 32. The power module 39 is disposed within the lower cover 301, and electrically connected with the current switch 33a of the operation module 36. In addition, the power module 39 comprises a negative connection part 37 and at least one battery 38. When an external force is applied to the pen tip 31 of the operation module 36, the pen tip 31 and the supporting part 32 are shifted in response to the external force. Consequently, the engaging structure 32a of the supporting part 32 is shifted relative to the multi-directional auxiliary element 34, and the external force is downwardly transmitted to the circuit board 33. Under this circumstance, the current switch 33a on the circuit board 33 is triggered, so that the power module 39 is electrically conducted. Meanwhile, the IR LED at the pen tip 31 will be turned on, and the subsequent operation procedures will be performed. Due to the multi-directional operating mechanism and the power provided by the power module 39, the multi-directional touch control of the optical touch pen 3 can be achieved and the optical touch pen 3 can be sensitively activated to be conveniently operated by the user.

Figure 4A:
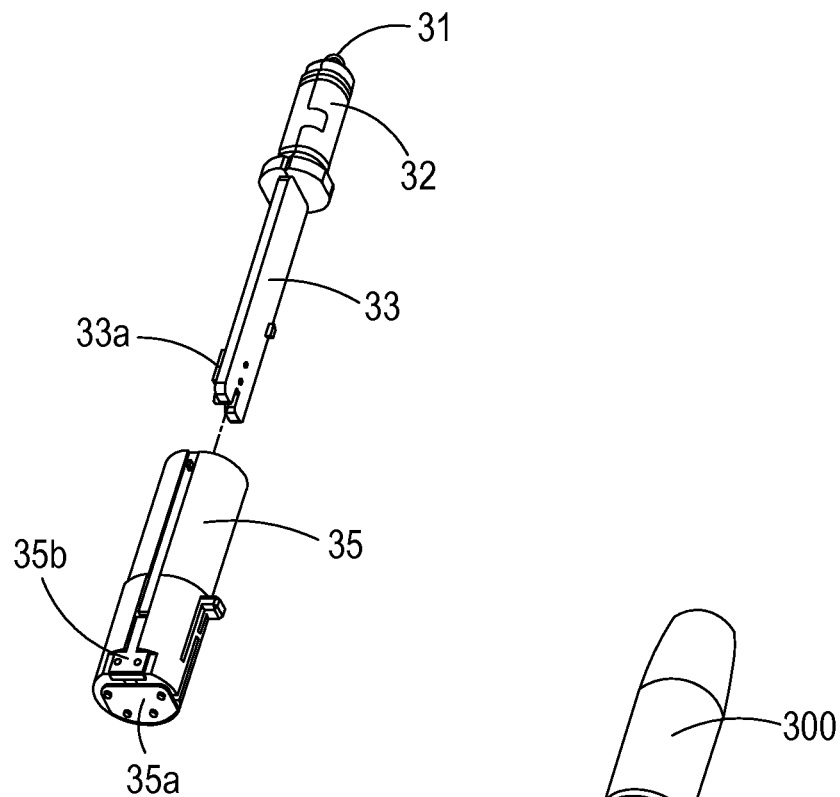
FIG. 4A is a schematic exploded view illustrating the pen tip, the supporting part, the circuit board and the sleeve of the operation module of the optical touch pen according to the embodiment of the present invention.

FIG. 4A is a schematic exploded view illustrating the pen tip, the supporting part, the circuit board and the sleeve of the operation module of the optical touch pen according to the embodiment of the present invention. In this embodiment, the supporting part 32 is composed of two semi-circular clamping pieces in order to clamp the pen tip 31 and the circuit board 33 simultaneously. In some embodiment, the supporting part 32 is a cylinder structure in order to clamp the pen tip 31 and the circuit board 33 simultaneously. It is note that the configurations and the clamping means of the supporting part 32 may be altered according to the practical requirements. A first end of the circuit board 33 is clamped by the supporting part 32. A second end of the circuit board 33 is a free end. The current switch 33a is disposed on the edge of the second end of the circuit board 33. In this embodiment, the pen tip 31, the supporting part 32 and the circuit board 33 of the operation module 36 are initially assembled during the fabricating process. When the worker of the production line wants to assemble the optical touch pen 3, the combination of the pen tip 31, the supporting part 32 and the circuit board 33 is firstly accommodated within the sleeve 35. As shown in FIG. 4A, a positive contact part 35a and a negative contact part 35b are disposed on a bottom surface and a lateral surface of the sleeve 35, respectively. The positive contact part 35a and the negative contact part 35b are electrically connected with the positive electrode and the negative electrode of the power module 39, respectively.

Figure 4B:
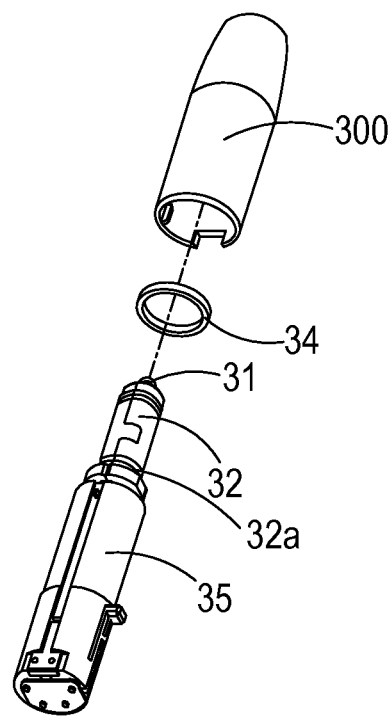
FIG. 4B is a schematic exploded view illustrating the relationship between the operation module and the upper cover of the optical touch pen according to the embodiment of the present invention.
Figure 4C:
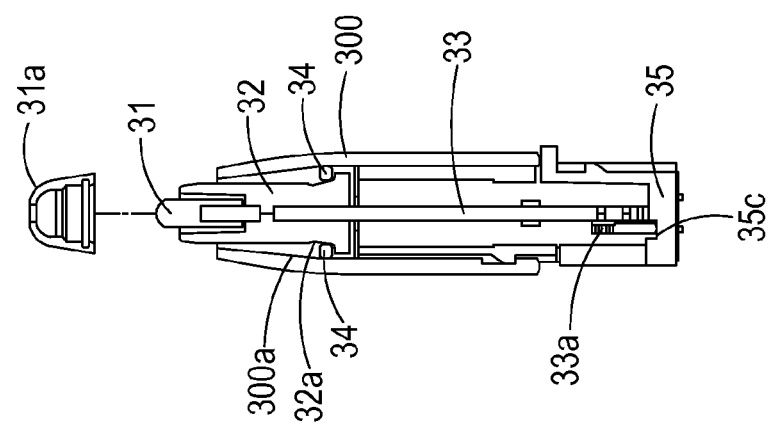
FIG. 4C is a schematic cross-sectional view illustrating the assembled structure of FIG. 4B.
Figure 4D:
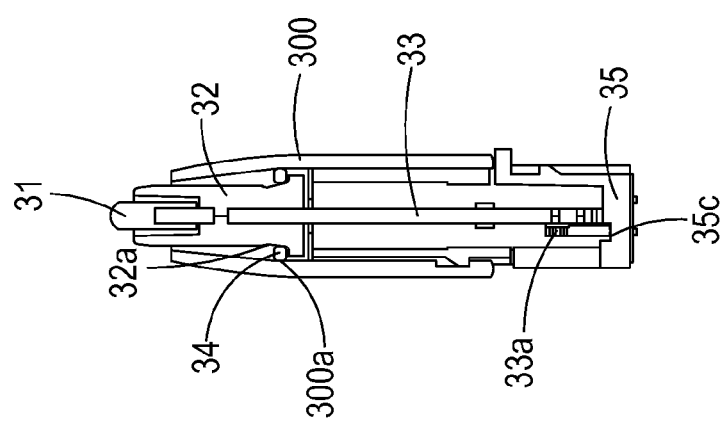
FIG. 4D schematically illustrates the relationship between a cap and the operation module of the optical touch pen according to the embodiment of the present invention.

FIG. 4B is a schematic exploded view illustrating the relationship between the operation module and the upper cover of the optical touch pen according to the embodiment of the present invention. FIG. 4C is a schematic cross-sectional view illustrating the assembled structure of FIG. 4B. FIG. 4D schematically illustrates the relationship between a cap and the operation module of the optical touch pen according to the embodiment of the present invention. After the combination of the pen tip 31, the supporting part 32 and the circuit board 33 is firstly accommodated within the sleeve 35 (see FIG. 4A), the pen tip 31, the supporting part 32, the circuit board 33, the sleeve 35 and the multi-directional auxiliary element 34 are collaboratively accommodated within the upper cover 300 of the pen case 30. In this embodiment, the engaging structure 32a is concaved in the surface of the lower region of the supporting part 32. Moreover, the engaging structure 32a has a slant surface. When the supporting part 32 is shifted in response to the external force, the slant surface of the engaging structure 32a is shifted relative to the multi-directional auxiliary element 34. In this embodiment, the multi-directional auxiliary element 34 is a ring-shaped structure, which is made of a plastic material or a silicone material with flexible property. It is noted that the type and material of the multi-directional auxiliary element 34 are not restricted. In some embodiments, the multi-directional auxiliary element 34 has a curvy surface. Alternatively, in some other embodiments, the multi-directional auxiliary element 34 has a sharp surface to be contacted with the engaging structure 32a of the supporting part 32.

After the components of FIG. 4B are assembled, a first side of the multi-directional auxiliary element 34 is contacted with and locked on the inner wall 300a of the upper cover 300, and a second side of the multi-directional auxiliary element 34 (e.g. the curvy surface or the sharp surface) is contacted and engaged with the slant surface of the engaging structure 32a of the supporting part 32. Meanwhile, the operation module 36 is assembled (see FIG. 4C). When the touch control actions of the optical touch pen 3 in different directions are performed, the shift of the slant surface of the engaging structure 32a relative to the multi-directional auxiliary element 34 may allow the external force to be uniformly and downwardly transmitted to the circuit board 33. Consequently, the current switch 33a is triggered. In some embodiments, the multi-directional auxiliary element 34 is integrally formed with the inner wall 300a of the upper cover 300. Under this circumstance, the assembling process is simplified. After the combination of the pen tip 31, the supporting part 32 and the circuit board 33 and the sleeve 35 are accommodated within the upper cover 300 and the engaging structure 32a of the supporting part 32 is engaged with the integrally-formed multi-directional auxiliary element 34, the multi-directional touch control of the optical touch pen 3 is also achieved. It is noted that the type and the location of the multi-directional auxiliary element 34 may be altered according to the practical requirements. Moreover, after the combination of the pen tip 31, the supporting part 32 and the circuit board 33 is accommodated within the sleeve 35, as shown in FIG. 4C, the current switch 33a on the edge of the second end of the circuit board 33 is just received in a recess 35c, which is formed in a bottom of the sleeve 35. Please refer to FIG. 4D. For protecting the IR LED of the pen tip 31, the pen tip 31 is covered by a cap 31a. It is noted that the type of the cap 31 is not restricted.

FIG. 5A is a schematic exploded view illustrating the relationship between the operation module and the power module of the optical touch pen according to the embodiment of the present invention. FIG. 5B is a schematic cross-sectional view illustrating the relationship between the operation module and the power module of the optical touch pen of FIG. 5A. FIG. 5C is a schematic perspective view illustrating the assembled structure of the optical touch pen of FIG. 5A. FIG. 5D is a schematic perspective view illustrating the pen tip of the optical touch pen of FIG. 5C. As shown in FIGS. 3, 5A and 5B, the power module 39 is disposed within an accommodation space 301a of the lower cover 301 of the pen case 30. The power module 39 comprises the negative connection part 37 and the at least one battery 38. In this embodiment, two batteries 38 are accommodated within the accommodation space 301a of the lower cover 301 of the pen case 30. The negative connection part 37 is an elongated metal sheet. The bottom of the negative connection part 37 is connected with a metallic spring (not shown). Consequently, the negative connection part 37 is electrically connected with a negative electrode 38b of the battery 38. For assembling the operation module 36 and the power module 39 of the optical touch pen 3, the batteries 38 and the negative connection part 37 are firstly accommodated within the accommodation space 301a of the lower cover 301. Then, the resulting structure of the operation module 36 and the upper cover 300 as shown in FIG. 4D is engaged with the lower cover 301. Consequently, the resulting structure of the optical touch pen 3 as shown in FIG. 5C is completed. As shown in the outer appearance of the optical touch pen 3, the optical touch pen 3 comprises the cap 31a of the pen tip 31, the upper cover 300 and the lower cover 301. The inner structure of the optical touch pen 3 is shown in FIG. 3. Since the operation module 36 and the power module 39 are tightly fixed within the upper cover 300 and the lower cover 301, the positive contact part 35a on the bottom surface of the sleeve 35 is directly contacted with the positive electrode 38a of the battery 38, and the negative contact part 35b on the lateral surface of the sleeve 35 is contacted with a contact terminal 37a at an end of the negative connection part 37. That is, the negative contact part 35b is electrically connected with the negative electrode 38b of the battery 38 through the negative connection part 37. Under this circumstance, as shown in FIG. 5D, the cap 31a of the optical touch pen 3 may be used to perform an interactive touch action or a handwriting action in multiple directions D or D'. Since the external force in diverse direction may be downwardly transmitted to the circuit board 33, the current switch 33a is triggered and turned on. Under this circumstance, the IR LED of the pen tip 31 is turned on, and the multi-directional touch control of the optical touch pen 3 is achieved.

Figure 6B:
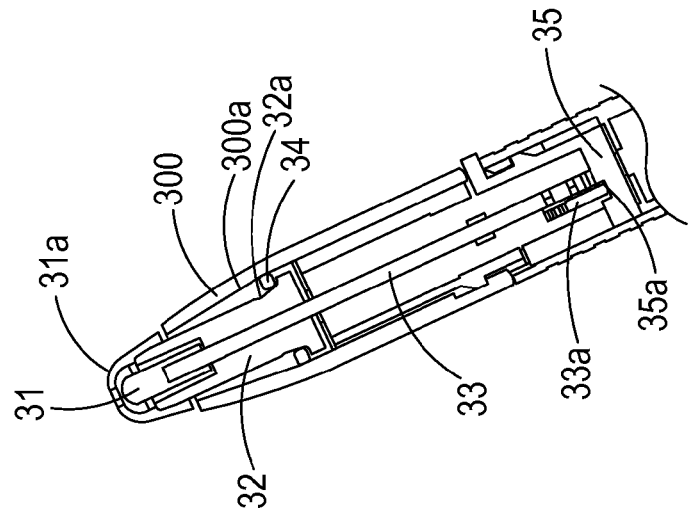
FIG. 6B is a schematic cross-sectional view illustrating a portion of the optical touch pen of FIG. 6A.
Figure 6A:
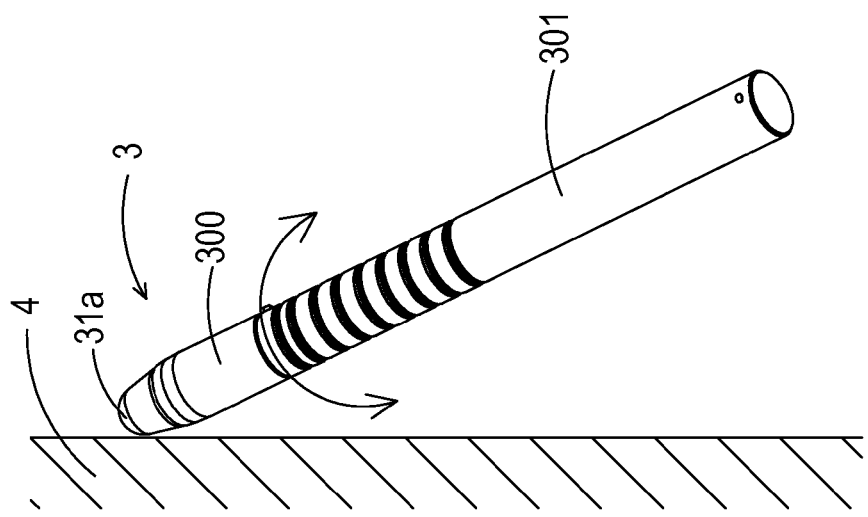
FIG. 6A schematically illustrates a lateral touch control action of the optical touch pen according to the embodiment of the present invention, in which the optical touch pen is inclined relative to the working surface.

FIG. 6A schematically illustrates a lateral touch control action of the optical touch pen according to the embodiment of the present invention, in which the optical touch pen is inclined relative to the working surface. FIG. 6B is a schematic cross-sectional view illustrating a portion of the optical touch pen of FIG. 6A. FIG. 6C schematically illustrates a vertical touch control action of the optical touch pen according to the embodiment of the present invention, in which the optical touch pen is vertical to the working surface. FIG. 6D is a schematic cross-sectional view illustrating a portion of the optical touch pen of FIG. 6C. As shown in FIG. 6A, the optical touch pen 3 is inclined relative to a working surface 4 (e.g. a wall surface) to touch the working surface 4. Meanwhile, the inner structure of the optical touch pen 3 is shown in FIG. 6B. In response to an inclined force on the cap 31a, the cap 31a is contacted with the pen tip 31 that is disposed within the cap 31a. The inclined force is also transmitted to the supporting part 32, so that the supporting part 32 is shifted. Under this circumstance, the slant surface of the engaging structure 32a of the supporting part 32 is shifted relative to the multi-directional auxiliary element 34. Consequently, the inclined force is transformed into a downward vertical force and transmitted to the circuit board 33. Under this circumstance, the current switch 33a on the circuit board 33 is triggered, so that the power module 39 is electrically conducted.

As shown in FIG. 6C, the optical touch pen 3 is vertical to the working surface 4 to touch the working surface 4. Meanwhile, the inner structure of the optical touch pen 3 is shown in FIG. 6D. In response to a vertical force on the cap 31a, the cap 31a is contacted with the pen tip 31. The vertical force is also transmitted to the supporting part 32, so that the supporting part 32 is shifted. Under this circumstance, the slant surface of the engaging structure 32a of the supporting part 32 is also shifted relative to the multi-directional auxiliary element 34. The downward vertical force is also transmitted to the circuit board 33. Under this circumstance, the current switch 33a on the circuit board 33 is triggered, so that the power module 39 is electrically conducted.

From the above descriptions, the present invention provides an optical touch pen without using a great number of complex components. During the fabricating process, a pen tip, a supporting part and a circuit board are initially assembled. Consequently, the subsequent assembling process is simplified and rapid, and the fabricating cost is effectively reduced. Due to the relative movement between the multi-directional auxiliary element and the engaging structure, the multi-angular and multi-directional touch control action of the optical touch pen may allow the external force to be uniformly and downwardly transmitted to the circuit board. Under this circumstance, the current switch is triggered and the control sensitivity is not impaired, and thus the multi-directional touch control is achieved. Consequently, the inventive optical touch pen is very convenient to the user.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch pen, comprising:
   a pen case comprising an upper cover and a lower cover;
   an operation module disposed within the upper cover, the operation module comprising:
      a supporting part having a first end and a second end, an outer surface of the second end forming an engaging structure, the engaging structure having a first end and a second end, the outer surface being slanted outwardly between the first end and the second end of the engaging structure,
      a pen tip secured within the first end of the supporting part;
      a circuit board having a first end and a second end, the first end of the circuit board being secured within the second end of the supporting part,
      a multi-directional auxiliary element that is arranged between an inner wall of the upper cover and the engaging structure of the supporting part, the multi-directional auxiliary element being configured to slide along the engaging structure when an external force is applied to the pen tip; and
      a current switch disposed at the second end of the circuit board; and
   a power module disposed within the lower cover and electrically connected with the current switch of the operation module.

2. The optical touch pen according to claim 1, wherein the multi-directional auxiliary element is a ring-shaped structure.

3. The optical touch pen according to claim 2, wherein the multi-directional auxiliary element has a curvy surface corresponding to and in contact with the engaging structure of the supporting part.

4. The optical touch pen according to claim 1, wherein the multi-directional auxiliary element is integrally formed with the inner wall of the upper cover.

5. The optical touch pen according to claim 4, wherein the multi-directional auxiliary element has a curvy surface corresponding to and in contact with the engaging structure of the supporting part.

6. The optical touch pen according to claim 1, wherein the optical touch pen further comprises a cap covering the pen tip for protecting the pen tip.

7. The optical touch pen according to claim 1, wherein the power module comprises a negative connection part and at least one battery.

8. The optical touch pen according to claim 7, wherein the operation module further comprises a sleeve, and a combination of the pen tip, the supporting part and the circuit board is accommodated within the sleeve, wherein the sleeve further comprises a positive contact part and a negative contact part, which are electrically connected with a positive electrode of the battery and a contact terminal of the negative connection part, respectively.

9. The optical touch pen of claim 1, wherein the first end of the engaging structure forms a concavity in the outer surface.

* * * * *